US006204319B1

(12) United States Patent
Houze et al.

(10) Patent No.: US 6,204,319 B1
(45) Date of Patent: Mar. 20, 2001

(54) AQUEOUS COATING COMPOSITIONS

(75) Inventors: Eric Charles Houze, Royal Oak; Patrick F. McIntyre, Bloomfield Hills, both of MI (US); Harry J. Spinelli, Wilmington, DE (US); Ayumu Yokoyama, Clarkston, MI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/183,458

(22) Filed: Oct. 30, 1998

(51) Int. Cl.$^7$ .................................................. C08K 3/00
(52) U.S. Cl. ........................................... 524/495; 524/505
(58) Field of Search ..................................... 524/495, 505

(56) References Cited

U.S. PATENT DOCUMENTS

| | | | |
|---|---|---|---|
| 3,668,172 | 6/1972 | Jones et al. | 260/32.6 R |
| 3,686,111 | 8/1972 | Makhlouf et al. | 260/31.2 |
| 3,755,244 | 8/1973 | Hart | 260/41 R |
| 4,116,924 | 9/1978 | Peabody | 260/40 R |
| 4,303,764 | 12/1981 | Becher et al. | 525/327 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham | 526/190 |
| 4,656,226 | 4/1987 | Hutchins et al. | 525/93 |
| 4,910,249 | 3/1990 | Kania et al. | 524/555 |
| 4,978,708 | 12/1990 | Fowler et al. | 524/507 |
| 5,041,477 | 8/1991 | Hays | 524/88 |
| 5,064,737 | 11/1991 | Kato et al. | 430/96 |
| 5,081,180 | 1/1992 | Bourguignon et al. | 524/762 |
| 5,089,658 | 2/1992 | Elmore et al. | 560/182 |
| 5,141,556 | 8/1992 | Matrick | 106/20 |
| 5,160,372 | 11/1992 | Matrick | 106/19 R |
| 5,162,399 | 11/1992 | Sharma et al. | 523/351 |
| 5,169,438 | 12/1992 | Matrick | 106/22 R |
| 5,205,861 | 4/1993 | Matrick | 106/20 D |
| 5,219,945 | 6/1993 | Dicket et al. | 525/276 |
| 5,221,334 | 6/1993 | Ma et al. | 106/20 D |
| 5,231,131 | 7/1993 | Chu et al. | 524/504 |
| 5,231,134 | 7/1993 | Carpenter et al. | 525/123 |
| 5,266,622 | 11/1993 | Mazanek et al. | 524/131 |
| 5,270,399 | 12/1993 | Czornij et al. | 525/327.6 |
| 5,272,201 | * 12/1993 | Ma et al. | 524/505 |
| 5,290,653 | 3/1994 | Pearlstine | 430/114 |
| 5,324,756 | 6/1994 | Gebregiorgis | 523/404 |
| 5,331,026 | 7/1994 | Benefiel et al. | 523/456 |
| 5,383,965 | 1/1995 | Carmine et al. | 106/284.24 |
| 5,424,364 | 6/1995 | Simms et al. | 525/170 |
| 5,437,718 | 8/1995 | Carmine et al. | 106/287.24 |
| 5,466,286 | 11/1995 | Briselli et al. | 106/404 |
| 5,494,511 | 2/1996 | Holbrook | 106/401 |
| 5,527,614 | 6/1996 | Carpenter et al. | 428/418 |
| 5,536,776 | 7/1996 | Carpenter et al. | 524/556 |
| 5,747,577 | 5/1998 | Gerroir et al. | 524/458 |
| 5,827,575 | 10/1998 | Kasari et al. | 427/380 |

FOREIGN PATENT DOCUMENTS

| | | |
|---|---|---|
| 19506978 | 12/1995 | (DE) . |
| 0 466 261 | 1/1992 | (EP) . |
| 628612 | 12/1994 | (EP) . |
| 2065157 | 6/1981 | (GB) . |
| 56-067532 | 6/1981 | (JP) . |
| 57-207652 | 12/1982 | (JP) . |
| 60-051762 | 3/1985 | (JP) . |
| 60-161469 | 8/1985 | (JP) . |
| 61-235478 | 10/1986 | (JP) . |
| 63066271 | 3/1988 | (JP) . |
| 63-145382 | 6/1988 | (JP) . |
| 01234479 | 9/1989 | (JP) . |
| 01249870 | 10/1989 | (JP) . |
| 04236274 | 8/1992 | (JP) . |
| 04270771 | 9/1993 | (JP) . |
| WO95/04109 | 2/1995 | (JP) . |
| 07126572 | 5/1995 | (JP) . |
| 08073800 | 3/1996 | (JP) . |

OTHER PUBLICATIONS

A. Vokoyama et al., A Comparison of the quality of Carbon Black Dispersions Prepared by Dry and Wet Grind Processes, *Journal of Coatings Technology*, 69,99–105, 1997.

V. A. Smrchek et al., Improvement of Dispersibility of Organic Pigments in Ink systems, *Kakokras. Mater. Ikh Primen.*, 2, 1984.

Watson, W. M., Designing Ink Dispersing Resins, *Am. Inkmaer*, 1983.

* cited by examiner

Primary Examiner—Edward J. Cain
(74) Attorney, Agent, or Firm—Hilmar L. Fricke; Steven C. Benjamin

(57) ABSTRACT

An aqueous coating composition containing:
(a) an aqueous carrier medium:
(b) a pigment having a pH below 7.0;
(c) an AB block copolymer pigment dispersant resin of
 (1) an A block of a hydrophobic polymer having amine groups; and
 (2) a B block of a hydrophilic polymer having hydroxyl groups and carboxyl groups;
the AB block copolymer has a number average molecular weight of 5,000–20,000 and contains 20–80% by weight of a polymeric A segment and correspondingly 80-20% by weight of a polymeric B segment;
wherein the pigment and the dispersant are present in a pigment to dispersant weight ratio of 0.1/1–20/1;
(d) a film forming polymeric binder containing carboxyl groups and
(e) a crosslinking agent which on curing of the coating composition will react with the carboxyl and hydroxyl groups of the AB block copolymer and the carboxyl groups of the film forming polymeric binder.

Pigment dispersions of the AB block copolymer and process for forming the dispersions also are part of this invention.

12 Claims, No Drawings

AQUEOUS COATING COMPOSITIONS

TECHNICAL FIELD

This invention relates to an aqueous coating composition and in particular to an aqueous coating composition containing a carbon black pigment dispersion formed with an AB-block copolymer that has improved black color jetness.

BACKGROUND OF THE INVENTION

AB copolymer dispersants are known in the art and are used to form pigment dispersions that are used in a variety of coating compositions and for inks, in particular for inks for ink jet printers. U.S. Pat. No. 4,656,226 issued Apr. 7, 1987, to Hutchins et al shows an AB block copolymer dispersant having polar groups such as acid or amine groups that attach to a pigment's surface and the other block of the polymer keeps the pigments stabile in the dispersion or coating composition. U.S. Pat. No. 5,231,131 to Chu et al issued Jul. 27, 1993 shows the use of graft copolymers to form aqueous pigment dispersions. U.S. Pat. No. 5,272,201 issued Dec. 21, 1993 to Ma et al and U.S. Pat. No. 5,221,334 issued Jun. 22, 1994, to Ma et al show AB or BAB block polymers that are used in aqueous printing inks to keep pigments dispersed in the inks.

A number of the above polymer dispersants are made via group transfer polymerization (GTP). GTP is a "Living" free radical polymerization technique and is a well-known technique that is used to form the aforementioned block polymers. In GTP, an initiator splits with one end going to the tail of an acrylic monomer unit and the other to the head. The group at the head transfers to the head of a second monomer unit as that unit is polymerized with the first. Such techniques are described in U.S. Pat. Nos. 4,417,034 issued Nov. 22, 1983, and 4,508,880 issued Apr. 2, 1985, to O. W. Webster and U.S. Pat. Nos. 4,414,372 issued Nov. 8, 1983, and 4,524,196 issued Jun. 18, 1985 to Farnham et al. The above patents are hereby incorporated by reference.

Conventional truck and automobile finishes comprise a clear coat applied over a pigmented base coat that is applied over a primer layer. The polymer dispersant used in the base coat must not only keep the pigment dispersed but needs to contain a reactive group that will react with the crosslinking agent used in the coating composition which on curing makes the dispersant an integral part of the resulting finish. Polymer dispersants can cause intercoat adhesion failures and usually are used only in limited amounts. It is desirable that the polymer dispersant have reactive groups that will bond with the primer layer to improve intercoat adhesion of the base coat to the primer rather than cause intercoat adhesion problems that cause flaking and chipping of the resulting finish. Carbon black pigments are particularly difficult to disperse and a dispersant is needed that disperses the carbon black pigment but also has the above properties.

SUMMARY OF THE INVENTION

An aqueous coating composition containing:
(a) an aqueous carrier medium:
(b) a pigment having a pH below 7.0;
(c) an AB block copolymer pigment dispersant resin of
  (1) an A block of a hydrophobic polymer having amine groups; and
  (2) a B block of a hydrophilic polymer having hydroxyl groups and carboxyl groups;
the AB block copolymer has a number average molecular weight of 5,000–20,000 and contains 20–80% by weight of a polymeric A segment and correspondingly 80-20% by weight of a polymeric B segment;
wherein the pigment and the dispersant are present in a pigment to dispersant weight ratio of 0.1/1–20/1;
(d) a film forming polymeric binder containing carboxyl groups and
(e) a crosslinking agent which on curing of the coating composition will react with the carboxyl and hydroxyl groups of the AB block copolymer and the carboxyl groups of the film forming polymeric binder.

Pigment dispersions of the AB block copolymer and process for forming the dispersions also are part of this invention.

DETAILED DESCRIPTION OF THE INVENTION

The novel coating composition of this invention is an aqueous based composition containing 10–70% by weight of film forming polymeric components which include the film forming polymeric binder, the crosslinking agent and the AB-block copolymer dispersant and a corresponding amount of 30–90% by weight of an aqueous carrier which is primarily water. Acidic difficult to disperse pigments can be used in this coating composition, such as carbon black. The AB block copolymer used in the composition has an A block which is hydrophobic and has amine functionality and is attracted to the acidic pigment. The B block of the copolymer is hydrophilic, contains hydroxyl and carboxyl groups which can be formed into a salt by the addition of ammonia or amine to make the copolymer easily dispersible in the aqueous medium and keeps the polymer and associated pigment dispersed in the aqueous medium.

The novel coating composition is stable and in general is non-flocculated or agglomerated. The AB block copolymer dispersant used in the composition is compatible with a variety of polymeric film forming binders that are conventionally used in coating compositions and in particular, compatible with acrylic polymers that are used in the novel coating compositions. Upon curing of the coating composition, the AB block copolymer reacts with other film forming components of the coating composition and becomes part of the film and does not cause deterioration of the film upon weathering as may occur if it remained an unreacted component of the film. Also, since the AB block copolymer is an excellent dispersant, the ratio of polymer to pigment is less than is used with conventional dispersants and a variety of difficult to disperse acid pigments can be dispersed thereby enlarging the number and types of pigment dispersions that can be formulated. Polymers also can be dispersed in an aqueous medium using the AB block copolymer. The AB block copolymer has reactive groups that improve adhesion to a primer layer thereby reducing flaking and chipping of the coating composition.

The coating composition contains a film forming binder, typically an acrylic polymer and a curing agent, such as a blocked polyisocyanate or an alkylated melamine. These provide excellent coating properties desirable for automotive finishes. Base coats of conventional base coat/clear coat finishes currently used on automobiles and trucks containing a carbon black pigment dispersion that uses the AB-block copolymer have significantly improved black jetness in comparison to base coats pigmented with carbon black pigment dispersions that utilize conventional random acrylic polymers.

The AB block copolymer used herein can be prepared by anionic polymerization or by Group Transfer Polymerization (GTP) techniques or by any other process, such as atom transfer, that can be used to prepare block copolymers. Preferably, the polymer is prepared using GTP techniques as described in the aforementioned GTP patents (U.S. Pat. Nos. 4,417,034, 4,508,880, 4,414,372 and 4,524,196). These polymers have a number average molecular weight of about 5,000–20,000, preferably about 7,500–15,000 and a polydispersity of 1.8–2.0. The A block or segment of the polymer comprises about 20–80% by weight of the polymer and correspondingly, the B block or segment of the polymer comprises about 80-20% by weight of the polymer.

All molecular weights referred herein are determined by GPC (gel permeation chromatography) using a polystyrene standard.

The term (meth)acrylate refers to both the acrylate and methacrylate esters.

The AB block copolymer has a relatively non-polar anchoring A segment and a relatively high polar stabilizing B-segment. The A-segment is designed to absorb on the surface of the pigment and the B-segment provides a steric stabilization of the pigment particle against flocculation. The A-segment must be available for interaction with the pigment surface; (2) of sufficient size to provide irreversible adsorption; and (3) not so large as to completely cover the pigment surface or cause collapse of the B-segment. The B-segment must be: (1) of sufficient size to provide steric stabilization (approximately number average molecular weight of 1500 or larger); and (2) compatible with the dispersion media, typically water or a solvent, and polymeric film forming material used in a coating composition.

The AB block copolymer can be prepared by anionic polymerization using conventional polymerization catalysts and solvents. Usually, the A segment is prepared first and then the B segment monomers are added and polymerized. It is possible to prepare the B segment initially and then the A segment to form the AB block polymer.

Preferably, the AB block copolymer is prepared by using GTP techniques in an inert atmosphere such as nitrogen by charging solvent such as a mixture of tetrahydrofuran and xylene, a catalyst such as tetrabutyl ammonium m-chlorobenzoate and initiator such as 1-methoxy-1-trimethylsiloxy-2-methyl propene into a polymerization vessel and then adding the B-segment monomers of alkyl (meth)acrylates, typically methyl methacrylate and butyl methacrylate, the silane blocked hydroxy alkyl (meth) acrylate, typically trimethylsiloxyethyl methacrylate, and methacrylic acid or acrylic acid. When most of the B-segment monomers have reacted typically over 99%, A segment monomers of an aryl (meth)acrylate and an alkyl amino alkyl (meth)acrylate and optionally an alkyl (meth) acrylate are added and polymerization is completed. Water or an alcohol such as methanol react to unblock the silane group of the hydroxy alkyl (meth)acrylate to form the AB block polymer dispersant used in this invention.

Other typical solvents, GTP polymerization catalysts and initiators used to form the AB block polymers are disclosed in the aforementioned GTP patents.

The A-segment of the copolymer contains mainly polymerized aryl (meth)acrylate monomers, i.e., benzyl acrylate or benzyl methacrylate or mixtures thereof and 1–20% by weight, based on the weight of the copolymer, of alkyl amino alkyl (meth)acrylate monomers having 14 carbon atoms in the alkyl group such as dimethyl amino ethyl methacrylate, diethyl amino ethyl methacrylate, dipropyl amino ethyl methacrylate, dibutyl amino ethyl methacrylate or acrylate esters thereof and the like. Optionally, alkyl (meth)acrylates, such as butyl methacrylate and 2-ethyl hexyl methacrylate and others shown below, can be used in the A-segment of the copolymer.

The B-segment of the copolymer contains polymerized alkyl (meth)acrylate methacrylic acid or acrylic acid and silane blocked hydroxy alkyl (meth)acrylate monomers that are subsequently unblocked by a reaction with water or an alcohol.

Typically useful alkyl (meth)acrylates are having 1–12 carbons in the alkyl group can be used in forming the AB block polymer are methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like and any mixtures thereof can be used. Other monomers that can be used with the alkyl(meth)acrylate monomers are isobornyl methacrylate and benzyl methacrylate.

Typically useful silane blocked hydroxy alkyl (meth) acrylates having 1–4 carbon atoms in the alkyl group that can be used are trimethylsiloxyethyl methacrylate, trimethylsiloxyethyl acrylate, trimethylsiloxypropyl methacrylate, trimethylsiloxypropyl acrylate, trimethylsiloxybutyl methacrylate, trimethylsiloxybutyl acrylate and the like.

Typically ammonia or an amine are added to the copolymer to neutralize the acid constituents. Primary and secondary amines can be used. One preferred amine is 2-amino methyl propanol which gives carbon black dispersions and coating compositions that have improved jetness and appearance in comparison to finishes formed with conventional carbon black dispersions. These above neutralization agents are typically added during the pigment dispersion process described below.

In one preferred embodiments, the AB block copolymer contains in the A-segment about 20 to 30 parts by weight benzyl methacrylate and 5–10 parts by weight dimethyl amino ethyl methacrylate and in the B-segment about 10–20 parts by weight of butyl methacrylate, 5–15 parts by weight of methyl methacrylate and 1–10 parts by weight of hydroxy ethyl methacrylate and 5–15 parts by weight methacrylic acid.

The AB block copolymer is used as a dispersing resin to disperse a wide variety of acidic pigments that are commonly used coating compositions. Typical pigments that are used are carbon black, metallic oxides such as iron oxides of various colors, zinc oxide, carbon black, filler pigments such as silicates and a wide variety of organic colored pigments such as quinacridones, copper phthalocyanines, perylenes, and the like.

To form a pigment dispersion, the AB block copolymer and the pigment to be dispersed are added to a suitable mixing vessel such as an attritor, sand mill, ball mill, two roll mill and the like and then mixed for about 5–150 minutes to form a dispersion having a yield stress of about 0–1,000 Pa (Pascal), a low shear (20 sec- 1) viscosity of about 100–10,000 m. Pas (milli Pascal seconds) and a high shear (1,000 sec-1) viscosity of about 10–1,000 m Pas measured on a Rotovisco viscometer.

The coatings compositions of this invention contain in addition to the pigment dispersion a binder preferably of an acrylic-based polymer and a crosslinking agent such as a melamine crosslinking agent, a polyisocyanate crosslinking agent or a blocked polyisocyanate crosslinking agent in an aqueous medium. The AB block copolymers form stable solutions or dispersions. These coating compositions contain about 10–70%, more typically 15–50% by weight of binder, and about 30–90%, more typically 50–85% by weight, of the liquid carrier. Suitable coating compositions are prepared by blending other useful components in accordance with normal paint formulation techniques.

The acrylic based polymer binders typically are polymers of alkyl (meth)acrylates having 1–12 carbon atoms in the alkyl group, hydroxy alkyl (meth) acrylates having 14 carbon atoms in the alkyl group and methacrylic or acrylic acid and have a number average molecular weight of 5,000–30,000 and are neutralized with ammonia or an amine to form aqueous solutions or dispersions. The aforementioned alkyl (meth)acrylates, hydroxy alkyl (meth)acrylates can be used to formulate these polymers.

To form a coating composition which will crosslink under elevated baking temperatures of about 60–180° C. for about 5–60 minutes, about 10 to 50%, preferably 15 to 30% by weight, based on the weight of the binder, of an alkylated melamine formaldehyde crosslinking agent having 14 carbon atoms in the alkylated group is preferred.

These crosslinking agents are generally partially or fully alkylated melamine formaldehyde compounds and may be monomeric or polymeric as described above. Blocked polyisocyanates can also be used as crosslinking agents.

Coating compositions containing a melamine crosslinking agent can contain about 0.1 to 1.0% by weight, based on the weight of a binder, of a strong acid catalyst or a salt thereof to lower curing temperatures and time. Aromatic sulfonic acids such as para toluene sulfonic acid or its ammonium salt are preferred catalysts. Other catalysts that can be used are dodecyl benzene sulfonic acid, phosphoric acid and amine or ammonium salts of these acids.

Other film forming polymers can also be used in these coating compositions such as acrylourethanes, polyesters and polyester urethanes, polyethers and polyether urethanes that are compatible. A polyisocyanate may be used as a crosslinking agent to provide a coating composition that will cure at ambient temperatures.

In addition, coating composition of the present invention may contain a variety of other optional ingredients, including fillers, plasticizers, antioxidants, surfactants and flow control agents.

To improve weatherability of a finish of the novel coating compositions, an ultraviolet light stabilizer or a combination of ultraviolet light stabilizers can be added in the amount of about 0.1–5% by weight, based on the weight of the binder. The stabilizer may be added for example to the pigment dispersion or may be added directly to the coating composition. Such stabilizers include ultraviolet light absorbers, screeners, quenchers, and specific hindered amine light stabilizers. Also, an anitoxidant can be added, in the amount of 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica and thickeners such as the Acrysol® copolymers from Rohm & Haas.

The coating compositions of the present invention may be utilized as a mono coat or in a pigmented color coat or base coat over which a clear coat is applied to provide a color coat/clearcoat finish.

Coating compositions of this invention have excellent adhesion to a variety of metallic or non-metallic substrates, such as previously painted substrates, primed substrates, cold rolled steel, phosphatized steel, and steel coated with conventional electrodeposition primers. These coating compositions can be used to coat plastic substrates such as polyester reinforced fiberglass, reaction injection-molded urethanes and partially crystalline polyamides. In particular, base coat or color coat composition of this invention, provide improved intercoat adhesion between the primer layer and the base coat and improved adhesion to the clear top coat. This improved adhesion results in significantly improved chip resistance of the resulting finish which is very important property for automobile and truck finishes.

Coating compositions of this invention can be applied by conventional techniques such as spraying, electrostatic spraying, dipping, brushing, flowcoating and the like. The preferred techniques are spraying and electrostatic spraying. In OEM applications, the composition typically is baked at 100–150° C. for about 15–30 minutes to form a coating about 0.1–3.0 mils thick. When the composition is used as a clearcoat, it is applied over the color coat that may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts, ratios and percentages are on a weight basis unless otherwise indicated. All molecular weights disclosed herein are determined by GPC (gel permeation chromatography) using a polystyrene standard.

EXAMPLE 1

An AB block copolymer was prepared and a pigment dispersion was prepared with the polymer and the pigment dispersion was formulated into a coating composition.

Preparation of AB-Block Copolymer

To a 5-liter flask equipped with an agitator, condenser, heating mantle, nitrogen inlet, thermocouple and an addition port 1600.0 g of tetrahydrofuran, 3.8 g of p-xylene were added. 0.6 ml of a 1.0 M solution of a catalyst of tetrabutyl ammonium m-chlorobenzoate in acetonitrile were added. 32.5 g of a 0.140 M solution of an initiator of 1,1-bis (trimethylsiloxy)-2-methyl propene were injected into the flask. Feed I of 0.6 ml of a 1.0 M solution of tetrabutyl ammonium m-chlorobenzoate in acetonitrile was started and added over 200 minutes. Feed II (trimethylsilyl methacrylate, 265.0 g (1.67 M), butyl methacrylate, 298.0 g (2.10 M), methyl methacrylate, 140.0 g (1.40 M), and trimethylsiloxyethyl methacrylate, 141.0 g (0.70 M) was started at 0.0 minutes and added over a 45 minute period. One hundred minutes after Feed II was completed (over 99% of the monomers had reacted) Feed III (benzyl methacrylate, 616.0 g (3.46 M), and dimethyl amino ethyl methacrylate, 154.0 g (0.980 M) was started and added over 30 minutes. At 400 minutes, 150 g methanol was added to the resulting reaction mixture to quench the reaction and deblock the hydroxy and acid monomers and solvent distillation was started. During the first stage of distillation, 400.0 g of solvent were removed. 100.0 g of methanol were added and an additional 200.0 g of solvent were distilled off.

The resulting polymer solution had a 50% solids content and the polymer had the following composition benzyl methacrylate/dimethyl amino ethyl methacrylate//butyl methacrylate/methyl methacrylate/hydroxy ethyl methacrylate/methacrylic acid in a weight ratio of 25/15// 15/10//5/12 and a number average molecular weight of 10,300.

Three carbon black pigment dispersions were prepared and each was formulated into a coating composition and the coating composition was applied to a substrate and physical properties of the each of the composition were compared.

Carbon Black Pigment Dispersion 1. —Carbon black pigment dispersion (2 roll mill process)

A random acrylic polymer of methyl methacrylate (MMA), butyl acrylate (BA), acrylic acid (AA) and mercapto ethanol (2-MERE) in a ratio of 54.9/33.6/9.8/1.7 having a weight average molecular weight of 8,000, a number average molecular weight of 4,000 and a polydispersity of 2 was formulated into a pigment dispersion using a conventional 2 roll mill process in which 45 parts by weight of carbon black pigment (Columbian 5000 Ultra II Powder) and 55 parts by weight of the above random acrylic polymer were charged into a conventional 2 roll mill and milled to uniformly disperse the carbon black pigment in the acrylic polymer. A pigment dispersion was prepared by mixing together the following constituents: 22.22 parts of the resulting milled product, 3.06 parts AMP-95 (2 amino methyl propanol) and 74.72 parts of water.

The resulting carbon black pigment dispersion had the following composition:

| Deionized water | 74.72 |
| Carbon black pigment | 10.00 |
| Acrylic random copolymer | 12.22 |
| AMP-95 | 3.06 | and had a solids content of 25.28% and a pigment to dispersant weight ratio of 0.82/1.

Carbon Black Pigment Dispersion No. 2—Carbon black pigment dispersion using random acrylic polymer A carbon black pigment dispersion was prepared using the above described random acrylic polymer which was neutralized with AMP-95 (2-amino methyl propanol) and the above described carbon black pigment was dispersed therein in a conventional high speed media mill to provide a carbon black pigment dispersion.

The resulting carbon black mill base had the following composition:

| Deionized water | 47.80 |
| Carbon black pigment | 10.00 |
| Acrylic random copolymer | 40.70 |
| AMP-95 | 1.50 | and had a solids content of 52.20% and a pigment to dispersant weight ratio of 0.25/1.

Carbon Black Pigment Dispersion No. 3—Carbon black pigment dispersion using AB block copolymer A carbon black pigment dispersion was prepared by using a conventional high speed media mill to disperse the above described carbon black pigment in the above prepared AB block copolymer which is neutralized with AMP-95.

The resulting carbon black pigment dispersion had the following composition:

| Deionized water | 70.80 |
| Carbon black pigment | 10.00 |
| AB block copolymer | 18.00 |
| AMP-95 | 1.50 | and had a solids content of 20.5% and a pigment to dispersant weight ratio of 1.11/1.

Coating Composition No. 1 was prepared by blending together the following constituents:

| | Parts by Weight |
|---|---|
| Acrylic Latex (32.7% solids in an aqueous medium of polymer of allyl methacrylate/methyl methacrylate/ methacrylic acid/hydroxy ethyl acrylate/butyl acrylate) | 445.41 |
| Water | 121.31 |
| AMP-95 | 2.47 |
| Polyester Solution (80% solids in butoxyethanol of a polyester of neopentyl glycol/trimethyl propane/ 1,6 hexanediol/isophthalic acid/phthalic anhydride/adipic acid/1,12 dodecane dioc acid) | 45.53 |
| "Cymel" 301 (methylated melamine crosslinking agent from Cytec Industries) | 46.20 |
| Agitan 281 (defoamer) | 8.44 |
| Mineral spirits | 50.43 |
| Butoxyethanol | 12.70 |
| Hexoxyethanol | 22.40 |
| Nacure XP-221 (aromatic sulfonic acid catalyst) | 1.00 |
| Carbon Black Pigment Dispersion No. 1 (prepared above) | 72.90 |
| ASE-60 (acrylic emulsion polymer thickener) | 7.21 |
| Total | 836.00 |

Coating Compositions 2 and 3 were prepared using the same constituents as above except for Coating Composition No. 2, Carbon Black Pigment Dispersion No. 2 was substituted for Carbon Black Pigment Dispersion No. 1 and similarly for Coating Composition No. 3 Carbon Black Pigment Dispersion No. 3 was substituted for Carbon Black Pigment Dispersion No. 1.

To form a sprayable composition, each of the above Coating Compositions 1–3 were adjusted to a pH of 8.1–8.5 and a viscosity of 1000–1500 centipoise measured on a Brookfield RV Viscometer using a #3 spindle at 5 rpm. Each of the Coating Compositions 1–3 was sprayed onto separate steel panels electrocoated with a cathodic primer of an epoxy amine resin crosslinked with an isocyanate to a film thickness of 0.8–1.2 mils and flash dried at 83 C. for 5 minutes and then a clear coat of 2 mils was spray applied and each panel was baked for 30 minutes at 130 C.

Each of the panels was measured for jetness of color. Jetness is a color measurement for black films. A full description of measuring Jetness is in a publication by Degussa Corporation, "Coloristic Measurements of Jet-Black and Grey Coatings," Technical Bulletin on Pigments, No. 37, 1994 and is hereby incorporated by reference. The Jetness No. is a function of L, a and b values measured at a 10 degree angle using a standard spectrophotometer and the Jetness No. is calculated using equations in the above publication. The Jetness No. increases with decreasing L, a and b values. Therefore, a desirable black basecoat with darker bluer color and less redness has a higher Jetness No. The Jetness No. for each of the panels is shown in the table below.

The amount of dispersant polymer adsorbed on the carbon black pigment was determined for each of the Carbon Black Pigment Dispersions 1–3 and is shown in the table below. Polymer adsorption was measured by a depletion method as described in Journal of Coatings Technology, 99, 865, 1997 which is incorporated by reference.

|  | Jetness No. | Polymer Adsorption (mg/g Carbon) |
|---|---|---|
| Coating Composition No. 1 (Carbon Black Dispersion 1 using random acrylic polymer and 2 roll mill process) | 280 | 270 |
| Coating Composition No. 2 (Carbon Black Dispersion 2 using random acrylic polymer and high speed media mill) | 225 | 135 |
| Coating Composition No. 3 (Carbon Black Dispersion 3 using AB block Copolymer-the invention) | 282 | 350 |

The above results show that Coating Composition No. 3 made with Carbon Black Dispersion No. 3 which used the AB block copolymer gave a coating that had substantially better Jetness in comparison to Coating Composition No. 2 made with the Carbon Black Pigment Dispersion 2 formulated with a random acrylic polymer which is the type of polymer conventionally used for pigment dispersions and gave slightly better Jetness than Coating Composition No. 1 formulated with Carbon Black Pigment Dispersion made with a random acrylic polymer and via a 2 roll mill process. The 2 roll mill process has been widely used to form pigment dispersions but is a time consuming and an expensive process. The use of dispersions made with the AB block polymer give a coating that is slightly better than coatings made with the 2 roll mill process and has the advantage of improved economics.

The polymer adsorption data shows that substantially more of the AB block copolymer is absorbed onto the carbon black pigment in comparison to the random acrylic polymer used to form s dispersion by either the 2 roll mill process or the high speed media mill process. One advantage of this is that the more polymer adsorbed onto the pigment as with the AB block copolymer used in the invention, the more stable the dispersion and the better quality appearance as is shown above by the Jetness No.

A second set of panel was prepared using above Coating Compositions 1 & 3 and each was repaired by recoating the panels using the same basecoat and clear coat and the same film thickness and rebaking using the above conditions. No sanding or other surface preparation was done to the panels before recoating.

The standard basecoat/clear coat panels and the second set of repaired panels were subjected to the following tests:

Gravelometer Chip Resistance Test (General Motors Procedure GM9508P, Method B). The chip resistance rating is based on the number and size of chips on the panel after testing. The range is from GM3 through GM9 where GM3 is a severe chip failure and GM9 is a minimal chip failure. The level of failure also is noted as follows: T=topcoat failure, PT=primer to topcoat failure and P=primer failure.

Crosshatch Tape Adhesion Test (ASTM D-3359B)
Rating 0%=no loss of adhesion, 100% =complete failure of adhesion.

| | | | | % Adhesion Loss | |
|---|---|---|---|---|---|
| | | Gravelometer Chip Resistance | | | 96 hrs 100% |
| Sample | Test Condition | −30 C | 28 C | Initial | humidity |
| Sample 1 Coating Comp. No.1 (random acrylic polymer 2 roll mill process) | Standard Repair | GM5 T GM5T | GM5-P/T GM4 T | 0 0 | 0 5,15 |
| Sample 3 Coating Comp. No. 3 (AB block copolymer-invention) | Standard Repair | GM5P/T GM5 T | GM5 T GM5 T | 0 0 | 0 0 |

The above data shows that the Chip Resistance at room temperature (28 C.) and % Adhesion Loss after 96 hours at 100% humidity for the Repair sample made with Coating Composition No.3 that used the AB block copolymer to disperse the carbon black pigment was improved in comparison to Sample 1 coated with Coating Composition No.1 that used a carbon black pigment dispersion made by using the conventional 2 roll mill process and a random acrylic copolymer.

We claim:
1. An aqueous coating composition comprising:
   (a) an aqueous carrier medium:
   (b) a pigment having a pH below 7.0;
   (c) an AB block copolymer pigment dispersant resin consisting of
      (1) an A block comprising a hydrophobic polymer having amine groups; and
      (2) a B block comprising a hydrophilic polymer having hydroxyl groups and carboxyl groups;
   the AB block copolymer having a number average molecular weight of 5,000–20,000 and consists of 20–80% by weight of a polymeric A segment and correspondingly 80-20% by weight of a polymeric B segment;
   wherein the pigment to dispersant weight ratio is 0.1/1 to 20/1;
   (d) a film forming polymeric binder containing carboxyl groups and
   (e) a crosslinking agent which on curing of the coating composition will react with the carboxyl and hydroxyl groups of the AB block copolymer and the carboxyl groups of the film forming polymeric binder.

2. The coating composition of claim 1 in which the pigment is carbon black pigment.

3. The coating composition of claim 1 in which the AB block copolymer is prepared by group transfer polymerization.

4. The coating composition of claim 3 wherein the polymeric A segment of the AB block copolymer consists of polymerized aryl (meth)acrylate and alkyl amino alkyl (meth)acrylate and the B segment consists of polymerized alkyl (meth)acrylate having 1–12 carbon atoms in the alkyl group, hydroxy alkyl (meth)acrylate having 14 carbon atoms in the alkyl group and acrylic acid or methacrylic acid.

5. The coating composition of claim 4 wherein the polymeric A segment of the AB block copolymer consists of an A segment of polymerized benzyl methacrylate and dimethyl amino ethyl methacrylate and the B segment consists of polymerized butyl methacrylate, methyl methacrylate, hydroxy ethyl methacrylate and methacrylic acid.

6. The coating composition of claim 2 wherein the crosslinking agent comprises an alkylated melamine crosslinking agent.

7. The coating composition of claim 2 in which the film forming polymeric binder is an acrylic polymer comprising an alkyl (meth)acrylate having 1–12 carbon atoms in the alkyl group, hydroxyl alkyl (meth)acrylate having 1–4 carbon atoms in the alkyl group and acrylic acid or methacrylic acid.

8. An aqueous pigment dispersion comprising carbon black pigment having a pH<7 and an AB block copolymer pigment dispersant consists of an A segment of polymerized aryl (meth)acrylate and alkyl amino alkyl (meth)acrylate and the B segment consists of polymerized alkyl (meth)acrylate having 1–12 carbon atoms in the alkyl group, hydroxy alkyl (meth)acrylate having 1–4 carbon atoms in the alkyl group and acrylic acid or methacrylic acid,
- wherein the AB block copolymer has a number average molecular weight of 5,000–20,000 and consists of 20–80% by weight of a polymeric A segment and correspondingly 80-20% by weight of a polymeric B segment; and
- wherein the weight ratio of pigment to dispersant ratio is 0.1/1–20/1.

9. The pigment dispersion of claim 8 in which the AB block copolymer consists of an A segment of polymerized monomers of benzyl methacrylate and dimethyl amino ethyl methacrylate and the B segment consists of polymerized monomers of butyl methacrylate, methyl methacrylate, hydroxy ethyl methacrylate and methacrylic acid.

10. A substrate coated with a dried and cured layer of the composition of claim 1.

11. The substrate of claim 10 having superimposed thereon a clear layer of a coating composition.

12. A process for preparing the dispersion of claim 8 in which the AB block polymer is formed by the process comprising
- (a) preparing the B segment of the polymer in the presence of a group transfer polymerization catalyst and initiator by polymerizing monomers of alkyl (meth)acrylate having 1–12 carbon atoms in the alkyl group and silane blocked hydroxy alkyl (meth)acrylate having 1–4 carbon atoms in the alkyl group of
- (b) polymerizing A segment monomers of aryl (meth)acrylate and alkyl amino alkyl (meth)acrylate in the presence of the B-segment of the polymer and deblocking the silane blocked hydroxy alkyl (meth)acrylate to form the AB block copolymer having a weight average molecular weight of about 5,000–20,000 and comprises 20–80% by weight of a polymeric A segment and correspondingly 80-20% by weight of a polymeric B segment; and
- (c) dispersing carbon black pigment in the AB block polymer dispersion to form a pigment dispersion.

* * * * *

UNITED STATES PATENT AND TRADEMARK OFFICE
CERTIFICATE OF CORRECTION

PATENT NO. : 6,204,319 B1
DATED : March 20, 2001
INVENTOR(S) : Eric C. Houze et al.

It is certified that error appears in the above-identified patent and that said Letters Patent is hereby corrected as shown below:

Column 10,
Line 64, "14 carbon atoms" should read -- I-4 carbon atoms --

Signed and Sealed this

Thirteenth Day of July, 2004

JON W. DUDAS
*Acting Director of the United States Patent and Trademark Office*